United States Patent [19]

Lehmann

[11] Patent Number: 4,581,797
[45] Date of Patent: Apr. 15, 1986

[54] CONTROLLED DEFLECTION ROLL

[75] Inventor: Rolf Lehmann, Rudolfstetten, Switzerland

[73] Assignee: Sulzer-Escher Wyss AG, Zurich, Switzerland

[21] Appl. No.: 573,152

[22] Filed: Jan. 23, 1984

[30] Foreign Application Priority Data

Jan. 28, 1983 [CH] Switzerland .......................... 490/83

[51] Int. Cl.⁴ ........................ B21B 31/32; B21B 13/02; B30B 3/00
[52] U.S. Cl. ................................ 29/116 AD; 29/122; 100/162 B
[58] Field of Search .......... 29/110, 113 AD, 116 AD, 29/122, 148.4 D; 100/162 B

[56] References Cited

U.S. PATENT DOCUMENTS 3,587,152 6/1971 Hold .............................. 29/116 AD
3,802,044 4/1974 Spillman et al. .......... 29/116 AD X Primary Examiner—Howard N. Goldberg
Assistant Examiner—Ronald S. Wallace
Attorney, Agent, or Firm—Werner W. Kleeman

[57] ABSTRACT

Two parallel rows of support elements are provided in a roll assembly for a controlled deflection roll comprising a stationary roll support and a rotatable roll shell supported by the support elements at the rotatable roll support. The support elements of one row are axially displaced or offset with respect to the support elements of the other row. The support elements of one row are circumferentially aligned with the spaces in the other row and partially overlap or overlie the support elements thereof. As a further modification the support elements of the two rows may also interleave in the circumferential direction. The roll pressure can be varied or adjusted by the individual supply of pressure fluid to individual support elements permitting finer and more accurate adjustment and regulation of the contact pressure at a greater number of regulation points in a roll device.

10 Claims, 5 Drawing Figures

CONTROLLED DEFLECTION ROLL

BACKGROUND OF THE INVENTION

The present invention broadly relates to contact pressure rolls and, more specifically, pertains to a new and improved construction of a controlled deflection roll assembly for rolling facilities.

Generally speaking, the controlled deflection roll of the present invention comprises a rotatable roll cylinder or shell rotatable about a stationary roll support member or beam and supported by support or pressure elements disposed in axial rows on the stationary support member or beam.

Such type of controlled deflection rolls are known, for instance from U.S. Pat. No. 3,587,152, granted June 28, 1971. They are used, for instance, in rolling mills or devices for rolling metals, such as aluminum or steel, or for rolling plastic foils, paper or textile webs or sheets, or are employed in printing press installations. In these applications it is often necessary to individually and independently adjust and regulate the contact pressure of the individual support or pressure elements at various points of the pressure or pressing line or axis. In the teachings of the state-of-the-art the support elements are individually supplied with pressure fluid and the pressure to the individual support elements is independently adjustable and regulatable.

In heretofore known controlled deflection rolls the number of regulation points in the axial direction was limited and was governed by the number of support elements. Even in rolls having a plurality of parallel rows of support elements no improvement was taught or contemplated, since support elements were provided in groups of two or more at the same axial position. Even when roll devices were provided with controlled deflection rolls having a regulation sufficiently fine for processing wide sheets of material or wide webs, when processing narrow sheets of material or webs they were served by a correspondingly lesser number of regulation points, so that the regulation was not sufficiently accurate, i.e. roll devices of this type could not be readily converted for handling narrower sheets or webs of material.

SUMMARY OF THE INVENTION

Therefore, with the foregoing in mind it is a primary object of the present invention to provide a new and improved construction of a controlled deflection roll which does not have associated with it the aforementioned drawbacks and shortcomings of the prior art constructions.

Another and more specific object of the present invention aims at providing a new and improved construction of a controlled deflection roll of the previously mentioned type having an improved, and particularly a finer, regulation of the contact pressure at different positions in the axial direction and in which sheets of material or webs of different widths can be rolled with improved accuracy of regulation.

Yet a further significant object of the present invention aims at providing a new and improved construction of a controlled deflection roll of the character described which is relatively simple in construction and design, extremely economical to manufacture, highly reliable in operation, not readily subject to breakdown and malfunction, and requires a minimum of maintenance and servicing.

An important feature of the invention is that at least some of the support or pressure elements of one row are axially displaced in respect to the support or pressure elements of another row.

In a particularly advantageous embodiment of the invention the support or pressure elements of one row overlap the support or pressure elements of another row, providing a maximum value of contact pressure.

In a further advantageous embodiment of the invention one of the rows of support elements extends over a maximum length of the axial direction of the controlled deflection roll while another row of support elements is of shorter length and is provided in that part of the controlled deflection roll where narrower sheets of material or webs are rolled, for instance only in the central portion of the roll.

The support or pressure elements can advantageously be structured as hydrostatic support elements supplied with a suitable pressure fluid or pressurized fluid medium, such as is taught in U.S. Pat. No. 3,802,044 granted Apr. 9, 1974. The support elements of the supplementary or other rows can also be structured as analogous hydrostatic support or pressure elements or as normal or standard hydrodynamic bearing or support elements movably disposed in cylindrical bores and supplied with pressure fluid.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
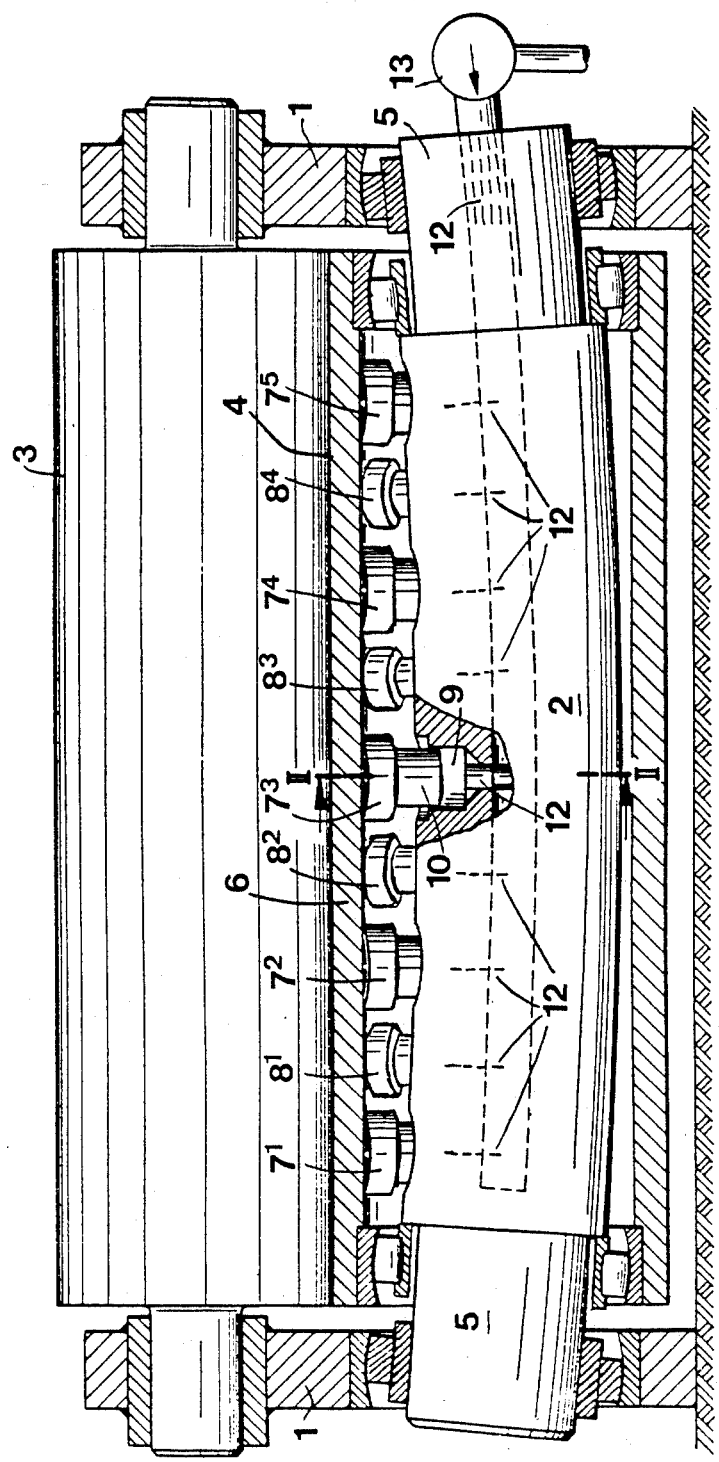
FIG. 1 is a schematic longitudinal section through a rolling device having a controlled deflection roll constructed according to the present invention.

Describing now the drawings, it is to be understood that to simplify the showing of the drawings only enough of the structure of the controlled deflection roll has been illustrated therein as is needed to enable one skilled in the art to readily understand the underlying principles and concepts of this invention. The illustrated exemplary embodiment of the controlled deflection roll will be seen to comprise a lower roll 2 of a rolling mill or device constituted, for instance, by this lower roll 2 and a further upper roll 3 arranged in a roll frame or roll stand 1 and between which a sheet of material or material web 4 is rolled. The upper roll 3 is structured as a massive or solid roll rotatably mounted in the roll frame or stand 1. The lower roll 2 is here shown as constituting a controlled deflection roll having a stationary roll support or beam 5 and a roll shell or cylinder 6 appropriately rotatably disposed thereupon. Alternatively, the upper roll 3 can also be a controlled deflection roll analogous to the lower roll 2.

In the controlled deflection roll of the invention the stationary roll support or beam 5 is supported at the roll cylinder or shell 6 by means of two rows of support or pressure elements $7^1$–$7^5$ and $8^1$–$8^4$. The support element rows $7^1$ to $7^5$ and $8^1$ to $8^4$ form parallel rows extending in the axial direction of the roll assembly and, in the example illustrated, the support element rows $7^1$–$7^5$ and $8^1$–$8^4$ are arranged circumferentially offset in mutual angular symmetry on both sides of the contact pressure plane or pressing plane P. They are arranged in mutually staggered relationship such that each support element of one support element row lies between two adjacent support elements of the other row in the axial direction. For instance, the support element $8^1$ is disposed between support elements $7^1$ and $7^2$ in the axial direction or the support element $7^4$ lies between the support elements $8^3$ and $8^4$ in axial direction. The support elements of one row are therefore provided in or aligned with the spaces of the other row. Alternatively, this displaced or uninterrupted arrangement of the support elements of the two rows can also be provided over only a portion of the roll length, for instance in the central portion.

Figure 2:
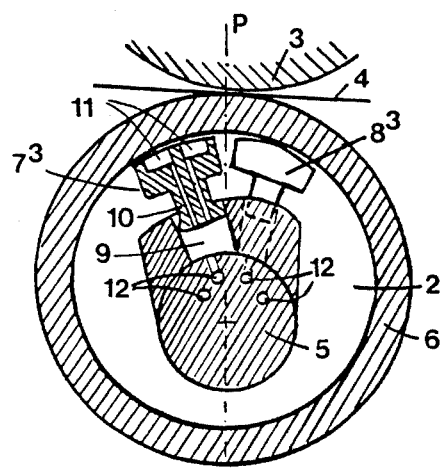
FIG. 2 is a schematic cross-section through the controlled deflection roll represented in FIG. 1, taken substantially along the line II—II thereof.

As shown in detail in FIG. 2 with reference to support element $7^3$, the support or pressure elements can be structured as hydrostatic support elements known per se, for instance of the type disclosed in the aforementioned U.S. Pat. No. 3,802,044. They can each comprise a piston 10 movably disposed in a cylindrical chamber or bore 9 defining an actuating chamber and with each such piston 10 having hydrostatic pressure pockets or chambers 11 on its bearing surface. The hydrostatic pressure pockets or chambers 11 communicate by means of not particularly referenced throttling passages or bores with the related cylindrical chamber 9 supplied with a suitable hydraulic pressure fluid, such as oil. The other row of support elements $8^1$ through $8^4$ can comprise classic hydrodynamic bearing or support elements also supplied with a pressure fluid or can comprise the same or analogous types of hydrostatic support elements.

The individual support elements $7^1$ to $7^5$ and $8^1$ to $8^4$, respectively, and their related pressure cylinders 9, are separately supplied with a suitable hydraulic pressure fluid through individual bores or conduits 12 and a suitable regulating device 13. In this way the pressure of the pressure fluid can be separately adjusted for the individual support or pressure elements.

The arrangement described provides the advantage that nearly twice as many regulation points are available for adjusting and regulating the contact pressure of the two rolls 2 and 3 against one another in the contact pressure plane or pressing plane P as would be the case with a single row of support elements. The regulation of the contact pressure can therefore be more finely controlled than with heretofore known constructions of controlled deflection rolls.

Figures 3, 4, 5:
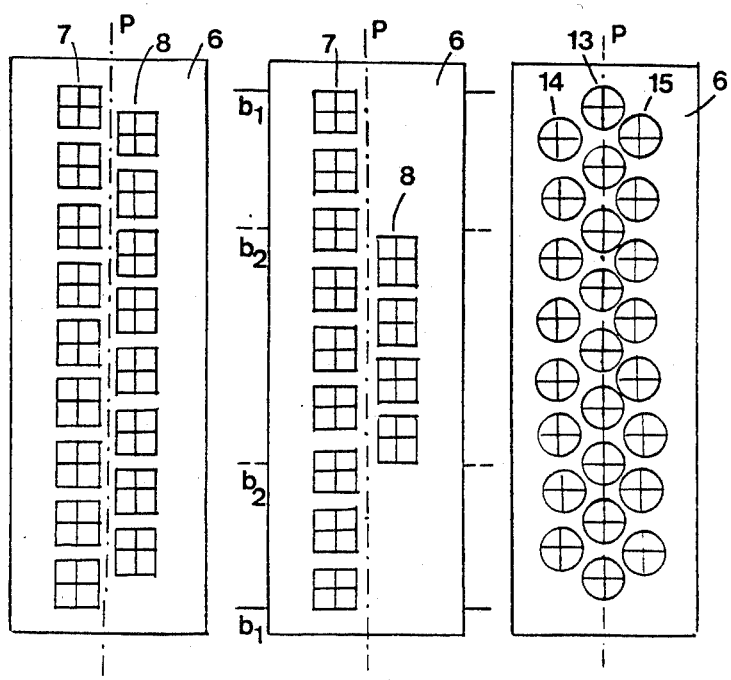
FIGS. 3 through 5 schematically show the arrangement of support or pressure elements in three different embodiments of the controlled deflection roll.

FIG. 3 schematically shows an arrangement of two rows of support or pressure elements 7 and 8 symmetrical to the contact pressure plane or pressing plane P analogous to the previously described embodiment. In contrast to the previous embodiment, the bearing surfaces of the support elements 7 and 8 have a greater dimensional extent, leaving only small spaces between the support elements of each row, so that the support elements of one row overlap the support elements of the other row in the axial direction of the controlled deflection roll. The advantage of this arrangement is that a greater bearing surface is available for supporting the roll shell or cylinder 6, so that a greater contact pressure can be obtained.

FIG. 4 shows a modified embodiment in which one row of support elements 7 extends over the entire length or axial extent of the controlled deflection roll 2 while the support elements 8 of the other row are only provided in the central portion of such roll 2. Such an arrangement is especially advantageous in rolling devices or rolling mills in which different widths of sheets of material or webs are to be rolled. While a single row of support elements 7 provides a sufficiently great number of regulation points for a wide sheet of material or web b1—b1, the corresponding number of regulation points available to a narrower sheet of material or web b2—b2 would be insufficient. By the addition of the second row of support elements 8 in the central portion of the roll 2 a sufficiently great number of regulation points for a narrow sheet of material or web is thus obtained.

FIG. 5 shows a further modified embodiment having three rows of support or pressure elements 13, 14, 15. The central row 13 lies in the contact pressure plane or pressing plane P and the other two outer rows 14, 15 are disposed symmetrically on each side of the contact pressure plane P. The circular form of the bearing surfaces permits an interleaving arrangement of the support elements of the different rows so that the distance between the center lines of the individual support element rows is less than the diameter of the support elements and the contact pressure force is concentrated more effectively at the contact pressure plane. Furthermore, this arrangement eliminates asymmetry.

While there are shown and described present preferred embodiments of the invention, it is to be distinctly understood that the invention is not limited thereto, but may be otherwise variously embodied and practiced within the scope of the following claims.
ACCORDINGLY,

What I claim is:
1. A controlled deflection roll, comprising:
    a stationary roll support member;
    a roll shell mounted to rotate about said stationary roll support member;
    support means mounted in the roll support member for supporting the roll shell at the stationary roll support member;
    said support means comprising at least two substantially parallel rows of support elements supporting said roll shell on said stationary roll support member and exerting a predetermined contact pressure;
    each one of said at least two substantially parallel rows containing a predetermined number of said support elements and extending in axial direction of the controlled deflection roll;
    said at least two substantially parallel rows of support elements being circumferentially offset from each other and being operatively associated with a predetermined plane; and
    said at least two substantially parallel rows of support elements being axially offset from each other such that said predetermined number of support elements in said at least two substantially parallel rows of support elements are arranged in a mutually staggered relationship in which each said support element in one of said at least two substantially parallel rows of support elements is aligned with a space formed between two adjacent ones of said support elements in an other one of said at least two substantially substantially parallel rows of support elements and in which each one of said support elements in each one of said at least two substantially parallel rows of support elements constitutes an independent and individual regulation means for regulating said contact pressure exerted by said at least two substantially parallel rows of support elements in said predetermined plane;

wherein the rows of support elements are circumferentially offset from each other, measured at their outer surfaces, a distance less than half the width of the individual support elements.

2. The controlled deflection roll according to claim 1, wherein:

each one of said predetermined number of support elements in said one row of support elements at least partially overlap in their individual axial dimensional extents the individual axial dimensional extents of said adjacent support elements in said other row of said at least two substantially parallel rows of support elements.

3. The controlled deflection roll according to claim 2, wherein:

each one of said predetermined number of support elements in said one row of support elements at least paritally overlap in their individual circumferential dimensional extents the individual circumferential dimensional extents of said adjacent support elements in said other row of said at least two substantially parallel rows of support elements in order to form an interleaving arrangement.

4. The controlled deflection roll according to claim 2, wherein:

the support elements of one row interleave with the support elements of other of said at least two rows.

5. The controlled deflection roll according to claim 1, wherein:

one of said at least two rows of support elements has a different axial extent than the other of said at least two rows.

6. The controlled deflection roll according to claim 5, wherein:

one of said at least two rows of support elements extends over the entire axial length of said controlled deflection roll.

7. The controlled deflection roll according to claim 6, wherein:

at least one of said at least two rows extends only over a central portion of the axial length of said controlled deflection roll.

8. The controlled deflection roll according to claim 1, wherein:

said support elements comprise pressure-actuated support members;

said stationary roll support comprises conduit means for supplying pressure fluid to said pressure-actuated support members; and said conduit means providing individual control of the pressure-actuated support members.

9. The controlled deflection roll according to claim 8, further including:

regulating means; and said conduit means being operatively connected with said regulating means for individually controlling said pressure-actuated support members.

10. The controlled deflection roll according to claim 8, wherein:

at least one of said pressure-actuated support members comprises a piston;

a cylinder having an actuating chamber;

means for supplying pressure fluid to said cylinder;

said piston being movably disposed in said cylinder and having a bearing surface engaging said roll shell to be supported;

at least one hydrostatic pressure pocket disposed in said bearing surface; and at least one throttling passage connecting said hydrostatic pressure pocket with said actuating chamber of said cylinder.

* * * * *